(12) United States Patent
Li et al.

(10) Patent No.: US 12,247,893 B2
(45) Date of Patent: Mar. 11, 2025

(54) TORQUE SENSING FOR ELECTRIC VEHICLE DRIVE SYSTEM

(71) Applicant: GM Global Technology Operations LLC, Detroit, MI (US)

(72) Inventors: Dongxu Li, Troy, MI (US); Chunhao J. Lee, Troy, MI (US); Farzad Samie, Franklin, MI (US); Paul Guillermo Otanez, Franklin, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 18/154,462

(22) Filed: Jan. 13, 2023

(65) Prior Publication Data
US 2024/0241001 A1 Jul. 18, 2024

(51) Int. Cl.
*G01L 3/04* (2006.01)
*B60L 15/20* (2006.01)

(52) U.S. Cl.
CPC ............... *G01L 3/04* (2013.01); *B60L 15/20* (2013.01); *B60L 2240/421* (2013.01)

(58) Field of Classification Search
CPC ....... G01L 3/04; B60L 15/20; B60L 2240/421
See application file for complete search history.

(56) References Cited

U.S. PATENT DOCUMENTS

| 8,966,978 B2 * | 3/2015 | Pannek | B62D 6/10 73/514.02 |
|---|---|---|---|
| 11,371,826 B2 * | 6/2022 | Irle | G01L 5/221 |
| 2013/0307449 A1 * | 11/2013 | Kobayashi | H02P 21/05 318/400.02 |
| 2016/0169755 A1 * | 6/2016 | Shizu | G01L 3/242 73/862.192 |
| 2024/0169825 A1 * | 5/2024 | Yamada | B62D 5/0463 |
| 2024/0241001 A1 * | 7/2024 | Li | B60L 15/20 |
| 2024/0300570 A1 * | 9/2024 | Washnock | B62D 5/0448 |

FOREIGN PATENT DOCUMENTS

| EP | 4273008 A1 * | 11/2023 | B60W 10/04 |
|---|---|---|---|
| WO | WO-2023214913 A1 * | 11/2023 | B60W 10/04 |

* cited by examiner

*Primary Examiner* — Thomas Ingram
(74) *Attorney, Agent, or Firm* — CANTOR COLBURN LLP

(57) ABSTRACT

A vehicle and a drive system include a method of operating the vehicle. In another exemplary embodiment, a drive system of a vehicle is disclosed. The drive system includes a first sensor, a second sensor and a processor. The first sensor is disposed at a first location of the drive system for measuring a first angle of rotation. The second sensor is disposed at a second location of the drive system for measuring a second angle of rotation. The processor is configured to determine a torque transferred between the first location and the second location based on a difference between the first angle of rotation and the second angle of rotation and control an operation of the drive system based on the torque.

20 Claims, 4 Drawing Sheets

TORQUE SENSING FOR ELECTRIC VEHICLE DRIVE SYSTEM

INTRODUCTION

The subject disclosure relates to drive systems for electric vehicles and, in particular, to a system and method for determining a torque at a drive system of an electric vehicle.

Operating a drive system of an electric vehicle relies on knowing the torques within the drive system. A drive system transfers torque from a motor to an axle and includes shafts which rotate under the application of a torque. The shafts are connected by gears that transfer the torque. Torques can be measured to aid in proper operation of the drive system. However, a shaft can twist or undergo torsion during rotation, thereby affecting the amount of torque that gets transferred and thus the efficiency of the drive system. Current sensor systems do not have the ability to account for the error present in measurements due to this torsion, thereby leading to inefficient operation of the drive system. Accordingly, it is desirable to provide a system and method for determining torque that accounts for the effects of torsion.

SUMMARY

In one exemplary embodiment, a method of operating a vehicle is disclosed. A first angle of rotation is measured using a first sensor at first location of a drive system of the vehicle. A second angle of rotation is measured using a second sensor at a second location of the drive system. A torque transferred between the first location and the second location is determined based on a difference between the first angle of rotation and the second angle of rotation. The torque is used to control an operation of the drive system.

In addition to one or more of the features described herein, the first location and the second location are separated by a distance along a shaft of the drive system. Wherein the first location is on a first shaft of the drive system and the second location is on a second shaft of the drive system having a gear relation to the first shaft, the method further includes determining the torque using the first angle of rotation, the second angle of rotation and a gear ratio between the first shaft and the second shaft. The method further includes measuring the first angle of rotation and the second angle of rotation during a same sampling period. The method further includes measuring, using at least one of the first sensor and the second sensor, at least one of an angle of rotation during a sampling period, and a plurality of angular increments, wherein the angular increments are accumulated to determining the angle of rotation. The method further includes measuring, using at least one of the first sensor and the second sensor, a speed of angular rotation and determining at least one of the first angle of rotation and the second angle of rotation by integrating the speed of angular rotation over a sampling period. At least one of the first sensor and the second sensor can be a resolver, an inductive sensor, a Hall-type sensor, an optical sensor, a sensor that measures absolute position, a sensor that measures incremental position, and a sensor that measures speed.

In another exemplary embodiment, a drive system of a vehicle is disclosed. The drive system includes a first sensor, a second sensor and a processor. The first sensor is disposed at a first location of the drive system for measuring a first angle of rotation. The second sensor is disposed at a second location of the drive system for measuring a second angle of rotation. The processor is configured to determine a torque transferred between the first location and the second location based on a difference between the first angle of rotation and the second angle of rotation and control an operation of the drive system based on the torque.

In addition to one or more of the features described herein, the first location and the second location are separated by a distance along a shaft of the drive system. Wherein the first location is on a first shaft of the drive system and the second location is on a second shaft of the drive system having a gear relation to the first shaft, the processor is further configured to determine the torque using the first angle of rotation, the second angle of rotation, and a gear ratio between the first shaft and the second shaft. The drive system further includes an aggregator for controlling the first sensor to measure the first angle of rotation and the second sensor to measure the second angle of rotation during a same sampling period. At least one of the first sensor and the second sensor is configured to measure one of an angle of rotation during a sampling period, and a plurality of angular increments, and the processor is further configured to accumulate the angular increments to determine the angle of rotation. At least one of the first sensor and the second sensor is configured to measure a speed of angular rotation, and the processor is further configured to determine at least one of the first angle of rotation and the second angle of rotation by integrating the speed of angular rotation over a sampling period. At least one of the first sensor and the second sensor is selected from a resolver, an inductive sensor, a Hall-type sensor, an optical sensor, a sensor that measures absolute position, a sensor that measures incremental position, and a sensor that measures speed.

In another exemplary embodiment, a vehicle is disclosed. The vehicle includes a drive system and a processor. The drive system includes a first sensor at a first location of the drive system for measuring a first angle of rotation and a second sensor at a second location of the drive system for measuring a second angle of rotation. The processor is configured to determine a torque transferred between the first location and the second location based on a difference between the first angle of rotation and the second angle of rotation and control an operation of the drive system based on the torque.

In addition to one or more of the features described herein, the first location and the second location are separated by a distance along a shaft of the drive system. Wherein the first location is on a first shaft of the drive system and the second location is on a second shaft of the drive system having a gear relation to the first shaft, the processor is further configured to determine the torque using the first angle of rotation, the second angle of rotation, and a gear ratio between the first shaft and the second shaft. The vehicle further includes an aggregator for controlling the first sensor to measure the first angle of rotation and the second sensor to measure the second angle of rotation during a same sampling period. At least one of the first sensor and the second sensor is configured to measure one of an angle of rotation during a sampling period, and a plurality of angular increments, and the processor is further configured to accumulate the angular increments are to determine the angle of rotation. At least one of the first sensor and the second sensor is configured to measure a speed of angular rotation, and the processor is further configured to determine at least one of the first angle of rotation and the second angle of rotation by integrating the speed of angular rotation over a sampling period.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
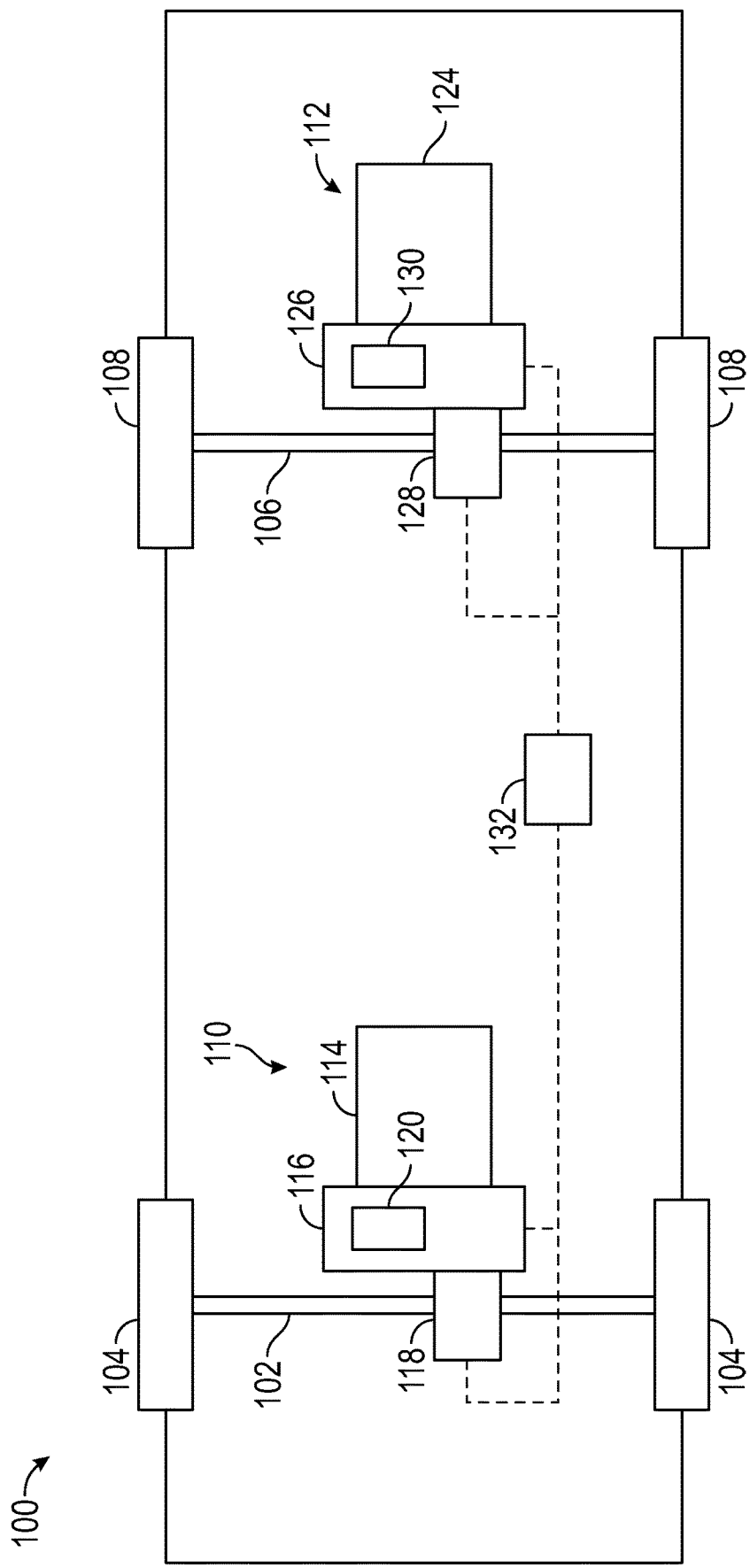
FIG. 1 shows a schematic diagram of an electric vehicle in a plan view.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a schematic diagram of an electric vehicle 100 in a plan view. The electric vehicle (or battery electric vehicle) includes a first axle (rear axle 102) that connects rear tires 104 and a second axle (front axle 106) that connects front tires 108. In other embodiments, the vehicle can be any type of vehicle, including a non-electric vehicle. A first drive system 110 provides power to the rear axle 102, and a second drive system 112 provides power to the front axle 106. The first drive system 110 can include a first battery (rear battery 114), first motor (rear motor 116), and first clutch (rear clutch 118). The rear motor 116 is an electric motor that converts power from the rear battery 114 into kinetic energy in the form of a rotation. The rear clutch 118 can engage the rear motor 116 to transfer the rotation from the rear motor to the rear axle 102 and rear tires 104. The rear motor 116 can include a first regenerative braking system 120. During braking, the first regenerative braking system 120 converts rotational energy of the rear axle 102 into electrical energy or current which is used recharge the rear battery 114.

Similarly, the second drive system 112 can include a second battery (front battery 124), second motor (front motor 126), and second clutch (front clutch 128). The front motor 126 is an electric motor that converts power from the front battery 124 into kinetic energy in the form of a rotation. The front clutch 128 can engage the front motor 126 to transfer the rotation to the front axle 106 and front tires 108. The front motor 126 can include a second regenerative braking system 130. During braking, the second regenerative braking system 130 converts rotational energy of the front axle 106 into electrical energy or current which is used to recharge the front battery 124. In an embodiment, the second drive system 112 can be engaged when the electric vehicle 100 is placed in an all-wheel drive mode and can be disengaged or shut down when not in the all-wheel drive mode.

While the electric vehicle 100 of FIG. 1 shows two drive systems, it is understood that there can be additional drive systems for different embodiments of the vehicle. In various applications, the rear axle can have multiple drive systems and/or the front axle can have multiple drive systems. Additionally, it is understood that the rear battery 114 and the front battery 124 can be replaced by a single battery that powers both the rear motor 116 and the front motor 126.

A controller 132 performs various operations of the vehicle, as discussed herein. The controller 132 can obtain measurements of the drive system(s) to determine operational parameters of the drive system(s) including output torque and efficiency. The controller 132 can also operate at least one of the rear motor 116 and the front motor 126 based on the measurements. The controller 132 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 132 may also include a non-transitory computer-readable medium that stores instructions which are processed by one or more processors of the controller to implement processes detailed herein.

Figure 2:
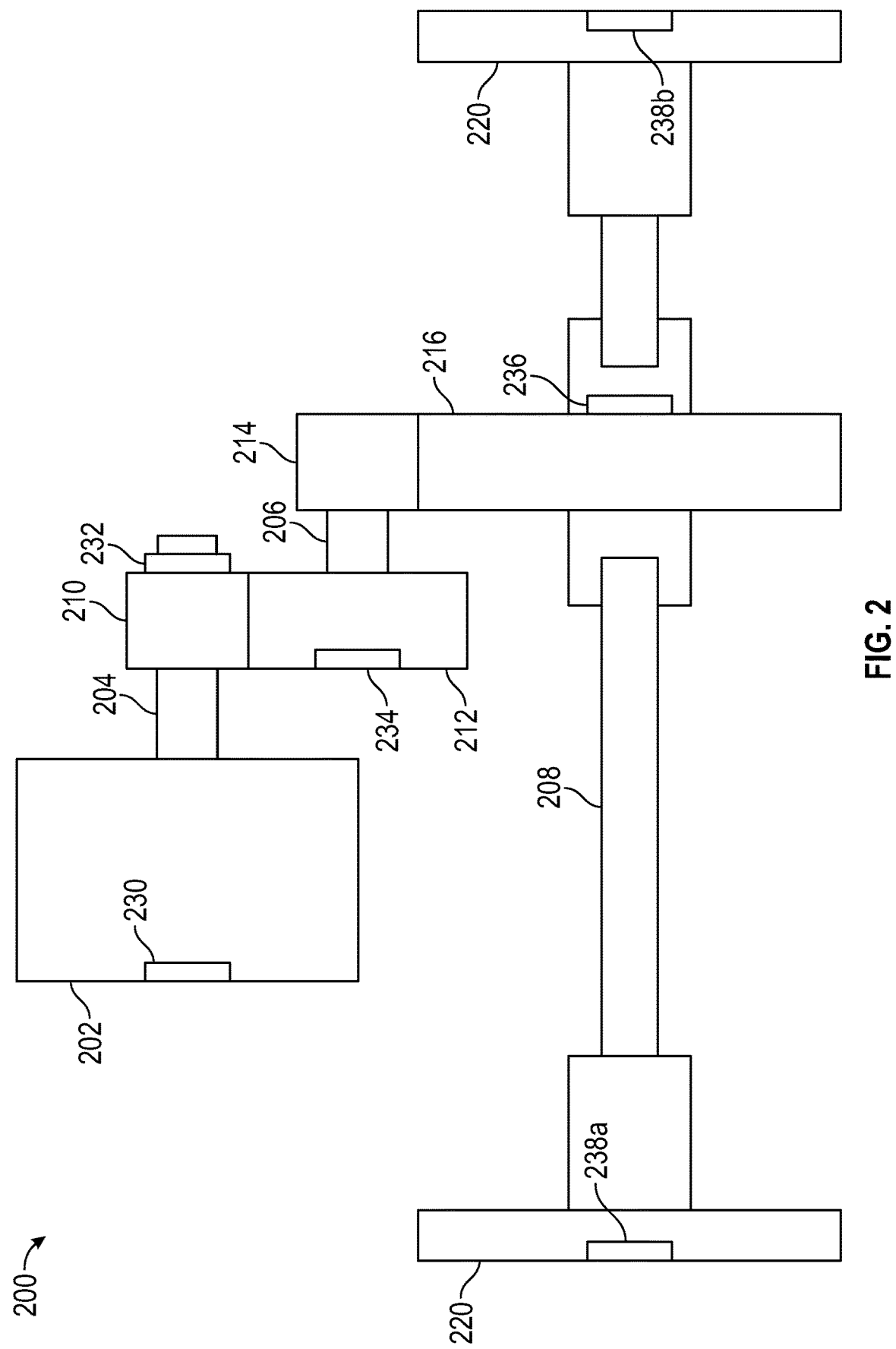
FIG. 2 shows a schematic view of a drive system of the vehicle, in an illustrative embodiment.

FIG. 2 shows a schematic view of a drive system 200 (such as first drive system 110 and/or second drive system 112) in an illustrative embodiment. The drive system 200 includes a motor 202, motor shaft 204, transfer shaft 206 and an output shaft 208. The motor shaft 204 includes a motor shaft gear 210. The transfer shaft 206 includes a first transfer gear 212 and a second transfer gear 214, and the output shaft 208 includes an output gear 216. The motor shaft gear 210 and the first transfer gear 212 form a first gear pair for transfer of torque between the motor shaft 204 and the transfer shaft 206. The second transfer gear 214 and the output gear 216 form a second gear pair for transfer of torque between the transfer shaft 206 and the output shaft 208. The output shaft 208 is coupled to one or more wheels 220.

In an operation of the drive system 200, the motor 202 operates to create a rotation and torque along the motor shaft 204. The first gear pair (motor shaft gear 210 and first transfer gear 212) are used to transfer this rotation to the transfer shaft 206. The second gear pair (second transfer gear 214 and output gear 216) are used to transfer the rotation from the transfer shaft 206 to the output shaft 208. During operation of the motor shaft 204, the torsion on any of the shafts can result in reducing an amount of torque being transferred to the wheels 220 or an efficiency of the drive system 200.

The drive system 200 includes a plurality of sensors for determining an angle of rotation at various locations and along various components of the drive system. A motor sensor 230 is located at the motor. A motor shaft sensor 232 is located at a location along the motor shaft 204 away from the motor sensor 230 (i.e., separate and a distance along the axis of the motor shaft). In various embodiments, the motor shaft sensor 232 is located at the motor shaft gear 210. A transfer shaft sensor 234 is disposed at the transfer shaft 206 and can be located at the first transfer gear 212, the second transfer gear 214 (not shown) or any other suitable location. An output shaft sensor 236 is disposed at the output shaft 208 and can be located at the output gear 216 or other suitable location. Wheels 220 can also include sensors as shown by left wheel sensor 238a and right wheel sensor 238b. Data from each of these sensors can be sent to the controller 132 to determine torque.

A difference in an angle of rotation between a first location of the drive system and second location of the drive system can be measured to determine torque. In an illustrative example, a first angle of rotation can be measured at the motor sensor 230 and a second angle of rotation can be measured at the motor shaft sensor 232. A difference between the first angle of rotation and the second angle of rotation can be referred to as a twist angle and indicates a twist or torsion of the motor shaft 204. A torque can be calculated from the twist angle based on the shaft stiffness. This torque can be used to adjust operation of the motor 202 to achieve a desired output torque at the wheels 220.

Torque can also be determined using sensors that are on different shafts. In an example, a first angle of rotation can be measured at the motor sensor 230 and a second angle of rotation can be measured at the transfer shaft sensor 234. Since the first sensor is located on a first shaft and the second sensor is located on a second shaft having a gear relation with the first shaft (i.e., being connected by gears) a gear ratio relating a rotation rate of one shaft to the rotation rate of the other shaft having the gear relation is taken into account to determine torque, as shown in Eq. (1):

$$\text{Torque} = K_{\text{eff}}(\theta_1 - R \cdot \theta_2) \quad \text{Eq. (1)}$$

where $\theta_1$ is the first angle of rotation measured at the first sensor (e.g., the motor sensor 230), $\theta_2$ is the second angle of rotation measured at the second location (e.g., the transfer shaft sensor 234), and R is the gear ratio between the between the first sensor and the second sensor (e.g., between the motor shaft gear 210 and the first transfer gear 212). Coefficient $K_{\text{eff}}$ can be indicative of a stiffness of a shaft between the first location and the second location and relates twist angle or angular difference to torque.

For measurements that are obtained from a first sensor and a second sensor that are separated by multiple gears (e.g., motor sensor 230 and output shaft sensor 236), the gear ratio R in Eq. (1) can be calculated to take account of the gear ratios of all gears between the first sensor and the second sensor (e.g., the gear ratio of the first gear pair and the gear ratio of the second gear pair).

When a wheel sensor is used in the torque calculation, both the left wheel sensor 238a and the right wheel sensor 238b are used to account for differences between them that are allowed by the differential. In an embodiment, the average of a measurement from the left wheel sensors 238a and a measurement from the right wheel sensor 238b is used to determine the angle (e.g., $\theta_2$). In addition, for multiple sensors that are co-located, their average measurements can be used in the torque calculations.

In various embodiments, a sensor can measure an angle of rotation and/or a speed of angular rotation. The sensor can be a sensor that measures absolution or incremental angular position or absolute or incremental speed. Exemplary sensors include a resolver, an inductive sensor, a Hall-type sensor, an optical sensor, etc. For a sensor measuring an angle of rotation, the measurements can be taken during a defined sampling period. Angular measurements can be obtained in time increments to obtain angular increments and the angular increments can be summed, integrated, or accumulated to determine an angle of rotation during the sampling period.

For a sensor measuring speed of angular rotation, the speed can be measured during a sampling period. The angle of rotation can be determined by multiplying the speed by the duration of the sampling period. Alternatively, multiple speed measurements can be obtained over multiple time increments. For each increment, an incremental angle of rotation can be determined from the incremental speed and the duration of the time increment. The multiple incremental angles of rotation can be accumulated or summed together to obtain the angle of rotation.

Figure 3:
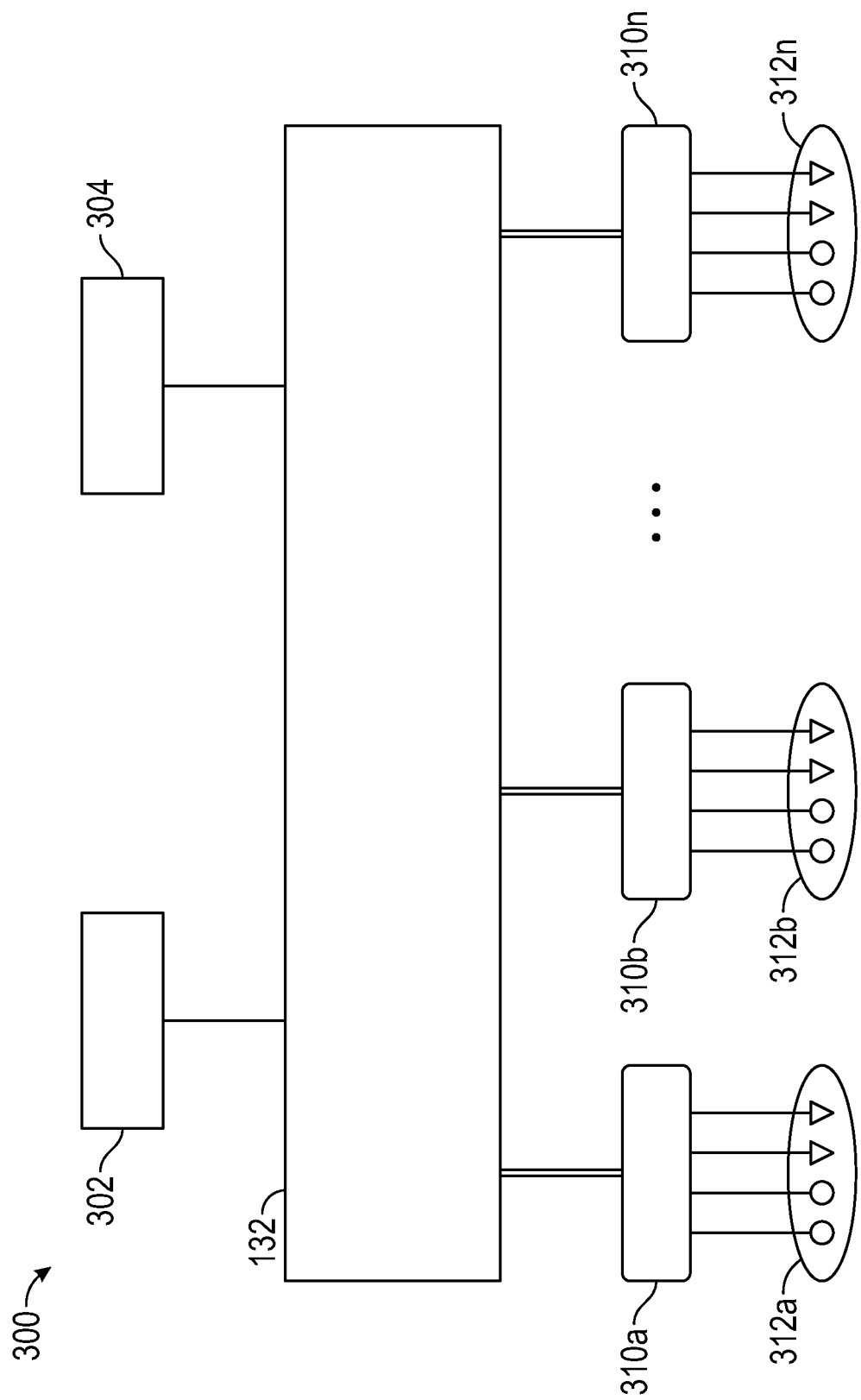
FIG. 3 shows an architecture of an operating system for the vehicle, in an embodiment.

FIG. 3 shows an architecture of an operating system 300 for the vehicle, in an embodiment. The operating system 300 for includes the controller 132 and actuators 302 for controlling various operation of the vehicle. In an embodiment, an actuator can be used to control operation of the motor 202 by adjusting its speed, etc. The controller 132 can also be in communication with a remote processor 304 to obtain additional information such as map data, etc., as well as for other communicative purposes.

The controller 132 controls operation of various aggregators 310a, 310b, ..., 310n that control the operation of the sensors of the drive system. Each aggregator 310a, 310b, ..., 310n controls operation of electronic devices 312a, 312b, ..., 312n. Each aggregator (e.g., aggregator 310a) has its own clock for controlling operations of its associate electronic devices (e.g., electronic device 312a). Therefore, operation of electronic devices can be synchronized when they are connected to the same aggregator. As an example, an aggregator (e.g., aggregator 310a) controls the acquisition of information from two sensors connected to it by synchronizing their operation so that their sampling periods have the same starting time and the same end time.

Figure 4:
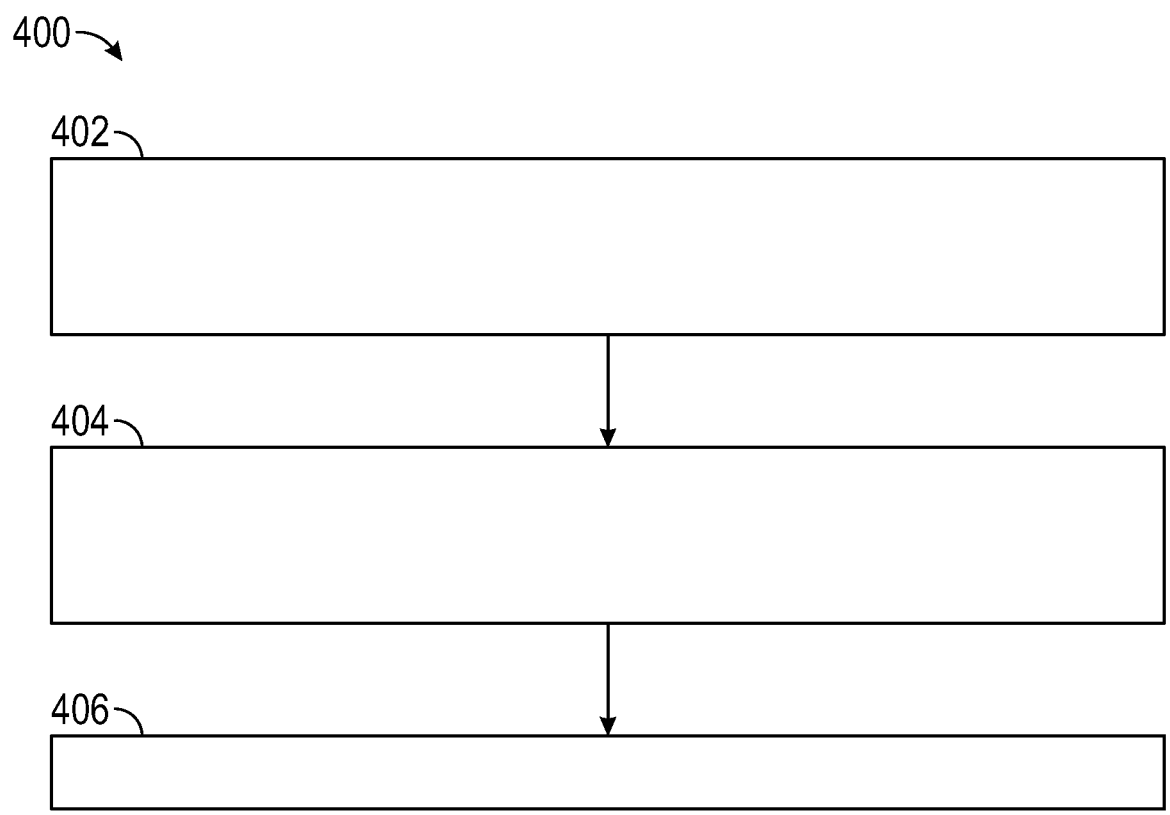
FIG. 4 shows a flowchart of a method of the invention.

FIG. 4 shows a flowchart 400 of a method of the disclosure. In box 402, an aggregator operates a first sensor and second sensor of the drive system to measure a first angle of rotation at a first location of the drive system and a second angle of rotation at a second location of the drive system. In box 404, a torque is determined between the first location and the second location based on a difference between the first angle of rotation and the second angle of rotation. In box 406, an operation of the drive system is controlled based on the torque. In various embodiments, controlling the operation of the drive system includes controlling or adjusting a motor speed to achieve a desired output torque at the wheels of the vehicle, using the torque in calculations to relate the motor torque to the output torque.

The terms "a" and "an" do not denote a limitation of quantity, but rather denote the presence of at least one of the referenced item. The term "or" means "and/or" unless clearly indicated otherwise by context. Reference throughout the specification to "an aspect" means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
measuring a first angle of rotation using a first sensor at a first location on a motor of a drive system of the vehicle, wherein the motor is connected to a motor shaft;
measuring a second angle of rotation using a second sensor at a second location on another shaft of the drive system, the other shaft having a gear relation to the motor shaft;
determining a torque transferred between the first location and the second location using the first angle of rotation, the second angle of rotation and a gear ratio between the motor shaft and the other shaft; and
controlling an operation of the drive system based on the torque.

2. The method of claim 1, further comprising measuring the first angle of rotation and the second angle of rotation during a same sampling period.

3. The method of claim 1, further comprising measuring, using at least one of the first sensor and the second sensor, at least one of (i) an angle of rotation during a sampling period; and (ii) a plurality of angular increments, wherein the angular increments are accumulated to determining the angle of rotation.

4. The method of claim 1, further comprising measuring, using at least one of the first sensor and the second sensor, a speed of angular rotation and determining at least one of the first angle of rotation and the second angle of rotation by integrating the speed of angular rotation over a sampling period.

5. The method of claim 1, wherein at least one of the first sensor and the second sensor is selected from: (i) a resolver; (ii) an inductive sensor; (iii) a Hall-type sensor; (iv) an optical sensor; (v) a sensor that measures absolute position; (vi) a sensor that measures incremental position; and (vii) a sensor that measures speed.

6. The method of claim 1, wherein the other shaft is a transfer shaft coupled to the motor shaft by a first gear pair.

7. The method of claim 1, wherein the other shaft is an output shaft having the gear relation with the motor shaft via a transfer shaft that is coupled to the motor shaft by a first gear pair and to the output shaft by a second gear pair.

8. A drive system of a vehicle, comprising:
a first sensor at a first location on a motor of the drive system for measuring a first angle of rotation, wherein the motor is connected to a motor shaft;
a second sensor at a second location on another shaft of the drive system for measuring a second angle of rotation, the other shaft having a gear relation to the motor shaft;
a processor configured to:
determine a torque transferred between the first location and the second location using the first angle or rotation, the second angle of rotation and a gear ratio between the motor shaft and the other shaft; and
control an operation of the drive system based on the torque.

9. The drive system of claim 8, further comprising an aggregator for controlling the first sensor to measure the first angle of rotation and the second sensor to measure the second angle of rotation during a same sampling period.

10. The drive system of claim 8, wherein at least one of the first sensor and the second sensor is configured to measure one of: (i) an angle of rotation during a sampling period; and (ii) a plurality of angular increments, and wherein the processor is further configured to accumulate the angular increments to determine the angle of rotation.

11. The drive system of claim 8, wherein at least one of the first sensor and the second sensor is configured to measure a speed of angular rotation, and wherein the processor is further configured to determine at least one of the first angle of rotation and the second angle of rotation by integrating the speed of angular rotation over a sampling period.

12. The drive system of claim 8, wherein at least one of the first sensor and the second sensor is selected from: (i) a resolver; (ii) an inductive sensor; (iii) a Hall-type sensor; (iv) an optical sensor; (v) a sensor that measures absolute position; (vi) a sensor that measures incremental position; and (vii) a sensor that measures speed.

13. The drive system of claim 8, wherein the other shaft is a transfer shaft coupled to the motor shaft by a first gear pair.

14. The drive system of claim 8, wherein the other shaft is an output shaft having the gear relation with the motor shaft via a transfer shaft that is coupled to the motor shaft by a first gear pair and to the output shaft by a second gear pair.

15. A vehicle, comprising:
a drive system including:
a first sensor at a first location on a motor of the drive system for measuring a first angle of rotation, wherein the motor is connected to a motor shaft;
a second sensor at a second location on another shaft of the drive system for measuring a second angle of rotation, the other shaft having a gear relation to the motor shaft;
a processor configured to:
determine a torque transferred between the first location and the second location using the first angle of rotation, the second angle of rotation and a gear ratio between the motor shaft and the other shaft; and
control an operation of the drive system based on the torque.

16. The vehicle of claim 15, further comprising an aggregator for controlling the first sensor to measure the first angle of rotation and the second sensor to measure the second angle of rotation during a same sampling period.

17. The vehicle of claim 15, wherein at least one of the first sensor and the second sensor is configured to measure one of: (i) an angle of rotation during a sampling period; and (ii) a plurality of angular increments, and wherein the processor is further configured to accumulate the angular increments are to determine the angle of rotation.

18. The vehicle of claim 15, wherein at least one of the first sensor and the second sensor is configured to measure a speed of angular rotation, and wherein the processor is further configured to determine at least one of the first angle of rotation and the second angle of rotation by integrating the speed of angular rotation over a sampling period.

19. The vehicle of claim 15, wherein the other shaft is a transfer shaft coupled to the motor shaft by a first gear pair.

20. The vehicle of claim 15, wherein the other shaft is an output shaft having the gear relation with the motor shaft via a transfer shaft that is coupled to the motor shaft by a first gear pair and to the output shaft by a second gear pair.

\* \* \* \* \*